United States Patent [19]
McMann et al.

[11] 3,856,987
[45] Dec. 24, 1974

[54] HORIZONTAL STABILIZING SYSTEM FOR FILM SCANNER

[75] Inventors: Renville H. McMann, New Canaan; Joseph G. Petit, Stamford, both of Conn.

[73] Assignee: Columbia Broadcasting System, Inc., New York, N.Y.

[22] Filed: Oct. 18, 1972

[21] Appl. No.: 298,534

[52] U.S. Cl. ............ 178/6.7 A, 178/7.2 R, 178/7.6, 178/DIG. 28
[51] Int. Cl. ............ H04n 5/84
[58] Field of Search ........ 178/6.7 R, 6.7 A, 5.4 CD, 178/DIG.28, 7.2 R, 7.5 R, 7.6, 7.7

[56] References Cited

UNITED STATES PATENTS

| | | | |
|---|---|---|---|
| 3,234,326 | 2/1966 | Goldmark et al. | 178/6.7 A |
| 3,585,293 | 6/1971 | Crowder | 178/6.7 A |
| 3,780,222 | 12/1973 | Pickstock et al. | 178/DIG. 28 |
| 3,809,806 | 5/1974 | Walker et al. | 178/7.6 |

*Primary Examiner*—Raymond F. Cardillo, Jr.
*Attorney, Agent, or Firm*—Martin M. Novack; Spencer E. Olson

[57] ABSTRACT

This disclosure is applicable to an apparatus for scanning a record medium or film having a succession of data frames along its length, the frames having recorded horizontally thereon a pilot pattern of constant predetermined frequency. The apparatus includes a film transport for moving the film at a uniform rate past a scanning position, a beam scanner for scanning frames with a beam in a horizontal scanline pattern at the scanning position, and processing circuitry for deriving a pilot signal from the scanned pilot pattern. The invention comprises an improved system for continuously maintaining horizontal registration between frames being scanned and the scanning beam. This maintenance of registration effectively removes alteral weaving from the ultimately displayed picture. An oscillator is provided for generating, during horizontal scan lines, a reference signal of substantially constant frequency, the reference signal having substantially the same frequency as the pilot signal. A comparator is provided for comparing the phase of the derived pilot signal to the phase of the reference signal and for generating a correction signal in accordance with the comparison. The correction signal is applied to the beam scanner to continuously adjust the horizontal centering thereof.

4 Claims, 2 Drawing Figures

HORIZONTAL STABILIZING SYSTEM FOR FILM SCANNER

BACKGROUND OF THE INVENTION

This invention relates to electronic systems for the reproduction of information recorded on a film and, more particularly, to such a system having improved horizontal stability in a reproduced video display.

It is well known that information recorded in a succession of frames on a film can be scanned electronically such as by flying spot scanner to provide an electrical output signal representative of the scanned information and can be produced on a display such as a television receiver. A particularly effective apparatus for recording picture information on photographic film is known as Electronic Video Recording (EVR), wherein picture information is recorded in successive frames and a television picture reproduced from this film by means of electronic scanning and processing of resulting video signals. Both monochrome and color pictures can be recorded and reproduced by electronic video recording techniques.

In the case of color recording, two adjacent picture tracks are provided along the film, one track being a luminance track comprising a succession of monochrome frames, the other track being a color track containing frames of encoded chroma information. The chroma information is recorded in encoded form so that black and white film can be used to store an image's color information. The encoding technique employs a carrier or pilot signal that is combined with a color carrier and recorded on the black and white film in a line scanning pattern which is in registration with the scanning pattern of the adjacent luminance frame. When the film is played back, the pilot signal is used as an index to recover the instantaneous phase of the color carrier signal. The step of combining the pilot and the color carrier before recording insures that the phase relationship between the color carrier and the pilot stays substantially constant. In this manner nonlinearities, raster-size changes in the film player, and film shrinkage interfere little with proper demodulation of the carrier.

A synchronization track is provided along the film and generally includes an aperture in alignment with each frame from which synchronization signals are derived. To reproduce the recorded picture information, the recorded frames are each scanned in a raster pattern compatible with a conventional television receiver, and a video signal is generated to cause display of the scanned picture on the television receiver. In one version of the EVR system, the film is scanned while moving by a flying spot that follows the direction of the film motion but at twice the film velocity. The vertical scan starts at the top of a frame and at the end of 1/60 of a second reaches the bottom of the frame. In this time the film moves one frame and the scan moves a vertical distance equivalent to about the height of two frames. During vertical blanking the spot returns to its original position to start the process over again on the next film frame. This technique, as well as an overall description of the EVR apparatus, can be found in an article entitled "Color EVR" which appeared in the Sept. 1970 issue of *IEEE Spectrum*.

The described type of electronic video recording apparatus can produce relatively stable pictures when a high quality film is transported at constant velocity past the electronic scanner. However, even small deficiencies in the quality of the film and variations in the scanner can cause noticeable vertical jitter or horizontal "weaving" in the displayed picture. Vertical jitter is brought about, for example, by variations in the velocity of the moving film from non-uniform spacing of the recorded frames and associated synchronization marks on the film. In the copending U.S. patent application Ser. No. 266,453 of Horowitz, McMann and Decker entitled "Stabilizing System for Film Scanner" that was filed June 26, 1972 (now U.S. Pat. No. 3,767,852) and assigned to the same assignee as the present application, there is disclosed a technique for reducing vertical jitter in a film scanning apparatus. The present disclosure, however, is concerned with the horizontal weave that sometimes appears in the displayed picture. As in all mechanical devices of the type in which a film is led through a gate, there is some tendency for the film to weave laterally as it passes through the gate. The weaving motion is transferred to the finally reproduced video signal, and the television picture as viewed therefore tends to weave back and forth laterally. This effect is, of course, undesirable, but attempts to reduce the weave mechanically, such as by modifying the gate design, tend to increase wear on the film and to decrease the ability of the gate to accept films of slightly different widths.

It is therefore one object of this invention to eliminate the type of lateral weaving found present in displayed pictures presented by an electronic video recording system.

SUMMARY OF THE INVENTION

The present invention is applicable to an apparatus for scanning a record medium or film having a succession of data frames along its length, the frames having recorded horizontally thereon a pilot pattern of constant predetermined frequency. The apparatus includes a film transport for moving the film at a substantially uniform rate past a scanning position, beam scanning means for scanning frames with a beam in a horizontal scanline pattern at the scanning position, and means for deriving a pilot signal from the scanned pilot pattern. The invention comprises an improved system for continuously maintaining horizontal registration between frames being scanned and the scanning beam. This maintenance of registration effectively removes lateral weaving from the ultimately displayed picture.

In accordance with the invention there are provided means for generating, during horizontal scanlines, a reference signal of substantially constant frequency. Further means are provided for comparing the phase of the derived pilot signal to the phase of the reference signal and for generating a correction signal in accordance with the comparison. Finally, means are provided for applying the correction signal to the beam scanning means.

In a preferred embodiment of the invention, the reference signal has substantially the same frequency as the pilot signal. In this embodiment, the correction signal is averaged over a predetermined time period and the averaged correction signal is applied to the deflection coils of the beam scanning means to continuously adjust the "centering" of the beam scanner. In this manner lateral weaving motion of the film is compensated for at the scanner.

Further features and advantages of the invention will become more readily apparent from the following detailed description when taken in conjunction with the accompanying drawings.

DESCRIPTION OF THE PREFERRED EMBODIMENT

Figure 1:
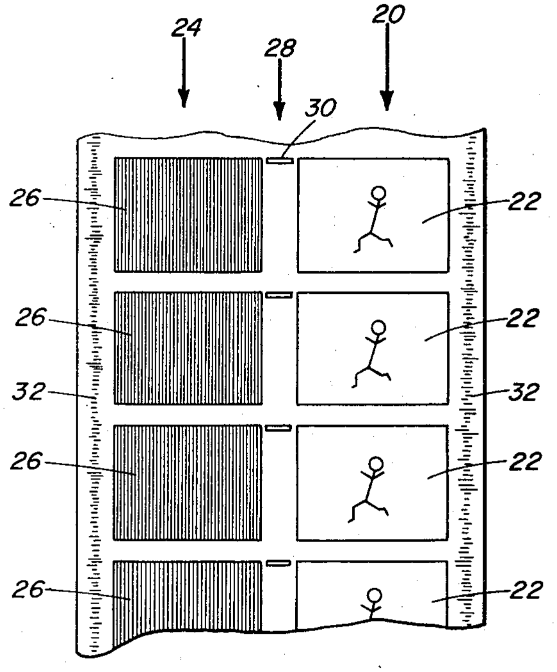
FIG. 1 is a fragmentary view of a typical film format for color picture information useful in the invention.

Before considering the operation of a system embodying the invention, it is useful to consider a typical film format useable therewith. A film format for color programming material is depicted in FIG. 1 and includes a luminance track 20 comprised of a succession of frames 22 of black and white pictures, and a color track 24 comprised of a succession of encoded frames 26 each associated with a respective frame 22 and each containing coded chroma information. A sync track 28 is provided on a longitudinal strip intermediate the two successions of frames and includes a plurality of light transmissive apertures 30 each aligned with the upper edges of respective frames 22 and 26. One or more sound tracks 32 along one or both edges of the film provide monaural or binaural audio information for reproduction along with the picture information. These audio tracks can be of magnetic or photographic form.

In order to provide a reference carrier for the color signal, an unmodulated pilot signal having exactly half the color carrier frequency is combined with the color carrier for recording across the chroma portion of the film. In the EVR system, the reference carrier is at 900 kilohertz, which is half the color carrier frequency of 1.8 MHz. Scanning non-linearity, raster-size changes, and film shrinkage—among other possible influencing factors—thus do not interfere with the proper demodulation of the chroma carrier since the phase relationship between it and the pilot carrier is automatically maintained within the required accuracy. All scan synchronizing signals and the pilot carrier are divided down from the color carrier frequency. Because of the integral relationship between the color and pilot carriers and the horizontal scan frequency, the pilot and chroma signals appear on the master film as a series of vertical bars (as is shown in the frames 26), deviating in horizontal direction only where color changes occur in the picture. For a complete discussion of the film format, along with description of the manner in which the film can be formed using electron beam recording techniques, the reader is referred to the above-referenced IEEE Spectrum article.

Figure 2:
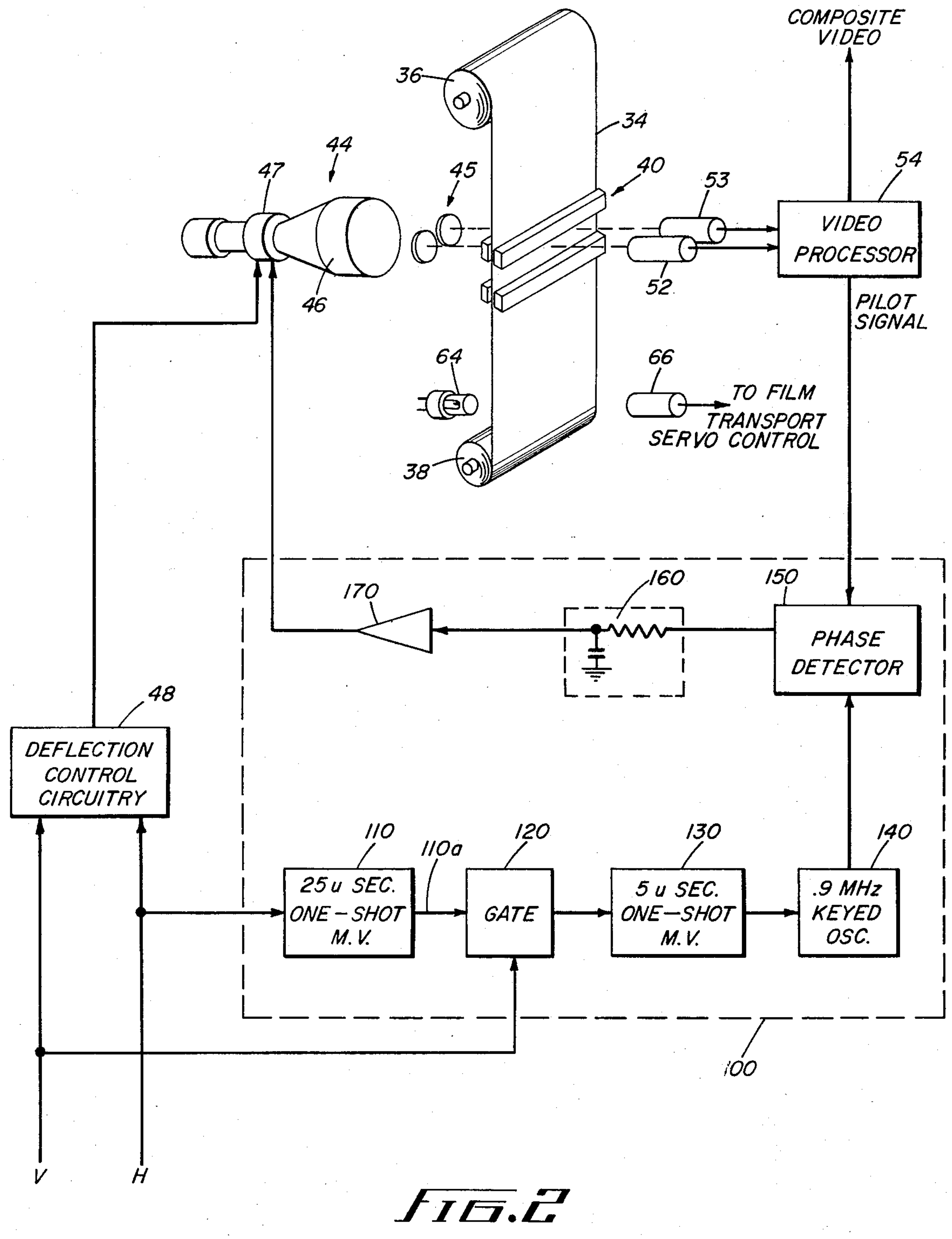
FIG. 2 is a diagramatic representation of a film reproducing apparatus which embodies the improvement of the present invention.

Reproducing apparatus for the film described in FIG. 1 and embodying the improvement of the present invention is shown in diagramatic form in FIG. 2. The apparatus is operative to electronically scan and continuously move film of the type described above, and to derive therefrom video and audio signals for reproduction of the program information recorded on film. The construction and operation of the EVR reproducing apparatus is described in detail in the above-referenced *IEEE Spectrum* article. A brief discussion of the playback system should suffice for present purposes. In FIG. 2, a film 34 is carried by a supply reel 36 and a takeup reel 38 of a film transport, that typically includes the drive mechanism (not shown) and a film gate 40. The film transport is operative to move the film 34 continuously at a substantially constant speed through the film gate 40 which defines a scanning position. The film is scanned at the scanning position by a flying spot scanner 44 and associated optics 45 which forms two beams that simultaneously scan adjacent frames of the film 34. The flying spot scanner includes, inter alia, a cathode ray tube 46 having horizontal and vertical deflection means 74 that are driven by associated deflection control circuitry 48. The scanner 44 is operative to scan images of a flying spot across the frames of film 34 in a raster pattern controlled by deflection means 47 in well known manner.

A pair of photodetectors 52 and 53 are disposed on the opposite side of the film 34 from cathode ray tube 46 to receive light scanned therethrough and to produce output signals representative of the amount of light transmitted through the film. The photodetector output signals are applied to a video processor 54 which provides video output signals for application to a television receiver or other utilization means for picture reproduction. For the color picture format of FIG. 1, the two photodetectors are operative to sense light scanned across respective frames 22 and 26 to provide respective output signals representing luminance and chrominance information. The signals are then applied to the video processor for production of a composite video output signal for application to a television receiver or the like.

Soundtrack sensing means (not shown) are typically disposed adjacent to respective soundtracks of the film 34 to provide audio signals to an audio processor (not shown), the audio processor providing audio output signals for application to utilization apparatus such as a television receiver.

A lamp 64 or other suitable light source is disposed with respect to the sync track on the film 34 to transmit light to the apertures thereon, these light pulses being received by a photosensor 66 such as a phototransistor. The derived synchronization signals from photosensor 66 are typically coupled to a film transport servo control means which causes a continuous and relatively stable advancement of the film.

Up to this point, the description of FIG. 2 has dealt with a conventional electronic video recording apparatus. The block 100, shown in dashed enclosure in FIG. 2, includes elements of a system that is directed to solving the problem of horizontal or lateral weave that is found present in the type of apparatus described. A monostable or "one-shot" multivibrator 110 receives the horizontal sync pulse and generates a positive-going signal **110*a* at a time during each horizontal scanline that is 25 microseconds after the occurrence of the horizontal sync pulse. The signal 110*a* is passed by a gate 120, which is normally opened, to another one-shot multivibrator 130. Upon being triggered by the signal 110, the one-shot 130 immediately generates a pulse of 5 microseconds duration, and this pulse is coupled to a keyed oscillator 140. The oscillator 140 is enabled for the 5 microsecond duration to pass its generated 0.9 MHz signal to a phase detector 150. The phase detector 150 receives as its other input the 0.9 MHz pilot signal that is derived from the scanned chroma frame. The pilot signal is conventionally derived by the video processor 54 for use in recovering chroma information, so it is readily available as an input. The phase detector 150 produces an output correction signal that varies in amplitude as a function of the phase difference between the derived pilot signal and the oscillator signal. This output is applied to a holding or averaging circuit 160 that preferably has a time constant of substantial duration so that individual line variations caused by a speck of dirt on the film or the like will not unduly disturb the correction signal. An appropriate value for the time constant is about 0.25 seconds. The output of circuit 160 is coupled through a suitable amplifier 170 to the horizontal centering adjustment input of the flying spot scanner 44. Horizontal centering is thus continuously adjusted in accordance with the correction signal. The gate 120 receives the vertical sync signal V and insures that the oscillator 140** does not produce signals for comparison during the vertical blanking interval.

In operation of the invention, the one-shot 110 establishes the approximate middle of the chroma frame as the place where the comparison is taken. If the film weaves horizontally the relative phase of the pilot signal derived from the film at a predetermined time after H will vary in proportion to the magnitude and direction of the weave motion. The amount of phase shift is determined by comparison, during a precise time interval, of the derived pilot with a reference signal of the same frequency whose phase is fixed with respect to the system time reference (H). A smoothed signal that is proportional to phase shift is applied to the flying spot scanner tube to continuously correct the centering thereof so that the film's weave is compensated for by the scanner. In essence, the scanner is driven to electronically achieve an overall "counter-weave" that cancels the mechanical motion of the film.

The invention has been described with reference to a specific embodiment but it will be appreciated that variations within the spirit of the invention will occur to those skilled in the art. For example, the monostable multivibrators are a convenient means of taking the desired phase comparison at the approximate center of each chroma frame. However, alternate known techniques could be utilized to achieve this end. It should be further noted that the main purpose of the disclosed system is to compensate for the effects of lateral film motion and not to set the absolute centering of the scanner. Thus, in the event the reference frequency is slightly different from the pilot frequency, there will be a resultant correction signal from the phase detector that will merely stabilize the overall system at a slightly different reference position, i.e., one that ultimately minimizes phase detector output. The desired stabilization will thus be achieved under this circumstance. It should be additionally noted that the invention applies equally well to various other film formats so long as a pilot signal is recorded thereon.

We claim:

1. In an apparatus for scanning a record medium having a succession of data frames along its length, said frames having recorded horizontally thereon a pilot pattern of constant predetermined frequency, said apparatus including a film transport for moving said film at a substantially uniform rate past a scanning position, beam scanning means including horizontal deflection means for scanning said frames with a beam in a horizontal scanline pattern at the scanning position, and means for deriving a pilot signal from the scanned pilot pattern, an improved system for continuously maintaining horizontal registration between frames being scanned and the scanning beam comprising;

means for generating, during horizontal scanlines, a reference signal of constant frequency;

means for comparing the phase of the derived pilot signal to the phase of the reference signal and for generating a correction signal in accordance with the comparison;

means for averaging said correction signal over a number of horizontal lines; and means for applying said correction signal to said horizontal deflection means.

2. The system as defined by claim 1 wherein said comparing means is operative only at the approximate center of each horizontal scanline.

3. The system as defined by claim 2 wherein said beam scanning means comprises a flying spot scanner and wherein said correction signal controls the horizontal centering of said flying spot scanner.

4. In an apparatus for scanning a record medium having a succession of data frames along its length, said frames having recorded horizontally thereon a pilot pattern of constant predetermined frequency, said apparatus including a film transport for moving said film at a substantially uniform rate past a scanning position, beam scanning means including horizontal deflection means for scanning said frames with a beam in a horizontal scanline pattern at the scanning position, and means for deriving a pilot signal from the scanned pilot pattern, an improved system for continuously maintaining horizontal registration between frames being scanned and the scanning beam comprising:

means for generating, during horizontal scanlines, a reference signal of constant frequency;

means for comparing the phase of the derived pilot signal to the phase of the reference signal and for generating a correction signal in accordance with the comparison, said means being operative only at the approximate center of each horizontal scanline; and means for applying said correction signal to said horizontal deflection means.

* * * * *